United States Patent
Wolf et al.

(10) Patent No.: US 7,093,463 B1
(45) Date of Patent: Aug. 22, 2006

(54) METHOD AND DEVICE FOR PRODUCING POWDERS THAT CONSIST OF SUBSTANTIALLY SPHERICAL PARTICLES

(75) Inventors: Gerhard Wolf, Hirschau (DE); Andreas Emmel, Hahnbach (DE)

(73) Assignee: Applikations-und Technikzentrum fur Energieverfahrens-Umwelt-und Stromungstechnik (ATZ-EVUS), Sulozbach-Rosenberg (DE)

( * ) Notice: Subject to any disclaimer, the term of this patent is extended or adjusted under 35 U.S.C. 154(b) by 444 days.

(21) Appl. No.: 10/110,550

(22) PCT Filed: Oct. 9, 2000

(86) PCT No.: PCT/DE00/03558

§ 371 (c)(1),
(2), (4) Date: Jul. 1, 2002

(87) PCT Pub. No.: WO01/28940

PCT Pub. Date: Apr. 26, 2001

(30) Foreign Application Priority Data

Oct. 15, 1999 (DE) .............................. 199 49 872
Jan. 20, 2000 (DE) .............................. 100 02 394

(51) Int. Cl.
*C03B 19/10* (2006.01)

(52) U.S. Cl. .......................... 65/21.2; 65/21.3; 65/141; 65/142; 261/76; 261/78.1; 264/5; 264/12; 425/570; 425/564

(58) Field of Classification Search ................. 65/21.2, 65/21.4, 21.5, 141, 142, 21.3; 264/12, 5; 425/564, 570; 261/76, 78.1
See application file for complete search history.

(56) References Cited

U.S. PATENT DOCUMENTS

| 2,044,680 | A |   | 6/1936  | Gilbert |
|-----------|---|---|---------|---------|
| 2,619,776 | A | * | 12/1952 | Potters ....................... 65/21.3 |
| 3,015,127 | A | * | 1/1962  | Stalego ........................ 65/441 |
| 3,243,273 | A | * | 3/1966  | Bland ............................. 61/21 |
| 3,294,511 | A |   | 12/1966 | Hess |
| 4,822,267 | A | * | 4/1989  | Walz ............................. 425/7 |
| 6,360,563 | B1 | * | 3/2002 | Gerhardt et al. ............. 65/21.1 |
| 6,805,726 | B1 | * | 10/2004 | Wolf ........................... 75/338 |

FOREIGN PATENT DOCUMENTS

BE 495 779 A 9/1950
EP 0 046 376 A 2/1982

* cited by examiner

*Primary Examiner*—Sean Vincent
(74) *Attorney, Agent, or Firm*—Rankin, Hill, Porter & Clark LLP

(57) ABSTRACT

A method for producing powders that consist of substantially spherical particles from a material such as glass, ceramics or plastic that produces a highly viscous melt that solidifies at a glass transition temperature $T_g$ or at a solidification temperature $T_s$. The inventive method comprises the following steps: (a) producing a melt of a viscosity $\eta$ in the range of from 0.1 to 100 Ns/m$^2$; (b) atomizing the melt using a first gas, the first gas having a temperature $T_A \geq T_g$ or $\geq 0.5 T_s$ at the outlet of the nozzle and (c) cooling off the particles produced by atomization in a cooling section downstream of the nozzle using a coolant, the temperature of the coolant being smaller than $T_s$ or $T_g$.

20 Claims, 2 Drawing Sheets

US 7,093,463 B1

Figure 1:
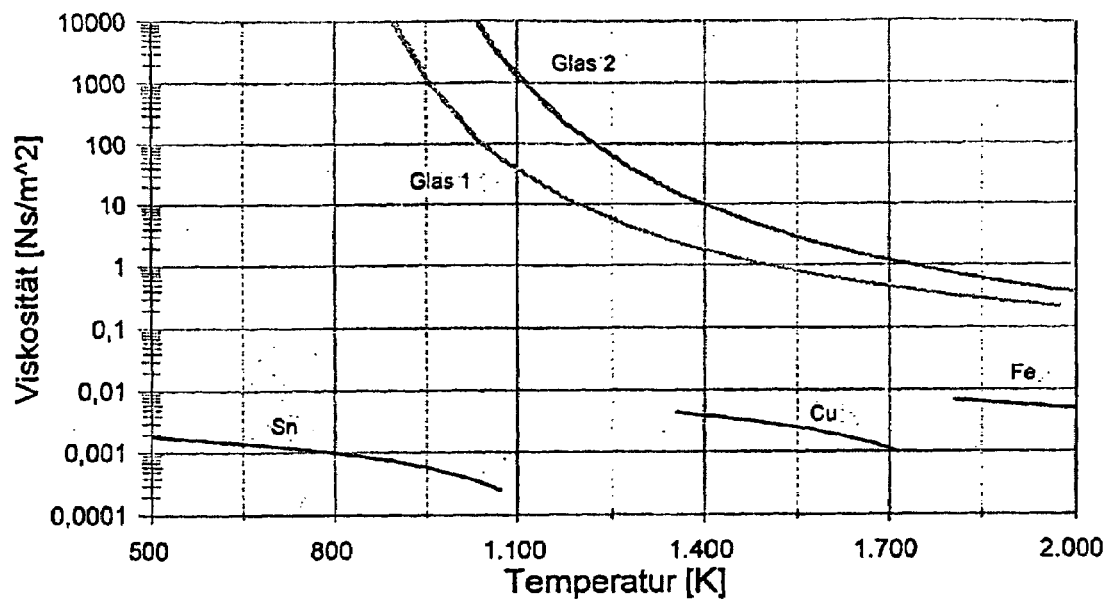

METHOD AND DEVICE FOR PRODUCING POWDERS THAT CONSIST OF SUBSTANTIALLY SPHERICAL PARTICLES

The invention relates to a process and an apparatus for producing powders, which are formed from substantially spherical particles, from a material, such as glass, ceramic or plastic.

DE-A 1 758 844 relates to a process for obtaining finely dispersed metal and alloy powders. In this process, a jet of molten metal, which is injected by a nozzle, is atomized by means of a hot-gas stream. The temperature of the hot-gas stream is lower than the solidification temperature of the injected metal.

DE 33 11 343 has likewise disclosed a process for producing fine metal powders. In this case, the stream of molten metal is atomized by a gas which is flowing at supersonic speed. Before it emerges from the nozzle, the gas is at a temperature in the range from 0.7 to 1.5 times the solidification temperature of the metal. The temperature of the gas after it has emerged from the nozzle is well below the solidification temperature of the metal, on account of its expansion.

DE 43 19 990 A1 has disclosed a process for producing particles of plastics. In this case, a viscous mass flow is delivered into an atomization apparatus, where a pressurized gas is sprayed onto it. The gas used in this case is cryogenically liquefied inert gas.

DE 35 33 964 C1 relates to a process for producing ultrafine powders in spherical form. In this case, inter alia ceramic melts are passed through a heated Laval nozzle. Immediately before it leaves the nozzle, the melt is in the superheated state. De 39 13 649 C2 has described a process for producing metallic powders from a metal melt by gas atomization. In the process, the temperature and/or pressure of the gas is varied in order to set a predetermined grain size distribution.

DE 40 23 278 A1 describes a process for producing metal oxide powders. In this case, oxygen is applied to the melt during the atomization operation. As a result, the metal powders are oxidized.

The known processes are not suitable for the production of powders which are formed from spherical particles from a highly viscous melt. On account of the high viscosity, fibrous particles, known as ligaments, or coarse, irregular particles are formed during the atomization and solidification.

It is an object of the invention to eliminate the drawbacks of the prior art. The intention is in particular to provide a process and an apparatus which allow the production of powders, which are formed from substantially spherical particles, from a highly viscous melt which in particular solidifies in a glass-like form.

This object is achieved by the features of claims 1 and 16. Expedient configurations will emerge from the features of claims 2 to 15 and 17 to 21.

The invention provides a process for producing powders, which are formed from substantially spherical particles, from a material, such as glass, ceramic or plastic, which forms a highly viscous melt, which solidifies either at a glass forming temperature $T_g$ or at a setting temperature $T_s$, comprising the following steps:

a) producing a melt with a dynamic viscosity $\eta$ in the range between 0.01 and 100 Ns/m$^2$, b) atomizing the melt using a first gas, the first gas, at the outlet of the nozzle, being at least at a temperature $T_A \geq T_g$ or $\geq 0.5\ T_s$, and c) cooling the particles formed during the atomization in a cooling zone, which is connected downstream of the nozzle, using a coolant, the temperature of the coolant being $<T_g$ or $T_s$.

The process according to the invention makes it possible to produce powders, which are formed from substantially spherical particles, from a material, such as glass, ceramic or plastic. Such materials form melts with a viscosity which is higher than that of metal melts; the dynamic viscosity of these melts is at least 0.01 Ns/m$^2$. The melts are generally superheated. The temperature of the melt, in the case of melts which solidify in a glass-like manner, is usually $\geq 1.5\ T_g$, and, in the case of melts which solidify in crystalline form, is approximately 100 K higher than $T_s$. The application of first gas with an outlet temperature of $T_A \geq T_g$ or $\geq 0.5\ T_s$ makes it possible to form spherical particles. The formation in particular of fibrous solidification particles, coarse or irregularly shaped particles is avoided.

According to an advantageous configuration, the temperature of the first gas is $\geq 1.5\ T_g$ or $\geq 1.0\ T_s$. The choice of temperature of the first gas is dependent on the material which is to be atomized. It is expedient for the temperature of the first gas, at the outlet of the nozzle, to be in the range of $\pm 100$ K of the setting temperature $T_s$ of the material.

When producing plastic powders, it should, of course be ensured that the temperature of the first gas is always below the decomposition temperature of the plastic. The temperature of the first gas is in this case preferably in the setting range $T_g$, but expediently approximately 50 K below the setting range $T_g$, of the plastic.

The first gas used is expediently air, nitrogen, noble gas, oxygen or a mixture thereof. It is particularly economical for the first gas to be preheated by means of a Pebble heater or bulk-material heater. According to a further feature of the process, the gas throughput is set to a value between 0.1 and 10 m$^3$/min. In this context, the term "m$^3$" is understood as meaning cubic meters (s.t.p.). For atomization, the pressure of the first gas may be set to a value of from 1 to 50 bar. The choice of throughput and of pressure of the first gas is in turn dependent on the material which is to be atomized.

The particle stream which is formed downstream of the nozzle passes into a cooling zone. The coolant used is a second gas or water. The second gas may be cryogenic liquefied gas. The coolant can be blown in toward the nozzle, in the opposite direction to the direction of flow of the particle stream. However, it is also possible for the coolant to be supplied in the direction of flow, in order to guide the particle stream. Further nozzles are provided downstream of the nozzle, in order to blow in the coolant. Particularly in the case of melts with a very high viscosity of more than 1 Ns/m$^2$, it is also possible for hot first gas to be blown in through the further nozzles instead of coolant, in order to assist the spherical shaping.

A bath formed from cryogenic liquefied gas or water may be provided downstream as a further coolant. The particles drop into this bath, are cooled and finally are separated out. Furthermore, it is expedient for the particle stream which forms downstream and in the immediate vicinity of the nozzle to be guided substantially horizontally. The particle stream, at a distance from the nozzle, is advantageously diverted in a substantially vertical direction. The guiding and/or diverting of the particle stream can be assisted by blowing in coolant. In this way, a particularly long cooling bath is formed, allowing spherical particles to be formed.

According to a further feature, it is possible, in the process, for the first gas, if appropriate a mixed gas formed from the first gas and the coolant, to be discharged and used to preheat a second Pebble heater. If the second Pebble heater is used to preheat the first gas, the heat of the first gas can be recycled.

To carry out the process according to the invention, there is an apparatus having aa) a device for preheating a first gas,
bb) a vessel for holding a melt,
cc) a nozzle which faces toward an atomization chamber,
dd) a device for cooling a particle stream which forms downstream of the nozzle,
ee) the nozzle being arranged substantially horizontally, and
ff) a device for guiding and/or diverting the particle stream into a substantially vertical direction being provided.

The apparatus makes it possible to produce powders, which are formed from substantially spherical particles, from a highly viscous melt, in particular which solidifies in a glass-like manner.

It is advantageously possible for the device for guiding and/or diverting to be optionally acted on, over a predetermined section, by hot first gas. This makes it possible to influence the cooling period and therefore the spheroidization time of the particles.

It has proven expedient and economical for the preheating device to be a Pebble heater. The nozzle may be an annular nozzle, for example a Laval nozzle. It is expediently possible to vary the width of the annular gap which is provided for discharging the first gas. The angle of incidence of the first gas with respect to the molten-jet axis may be up to 25°, preferably between 10° and 20°. This allows particularly effective atomization of the molten jet. Furthermore, it has proven expedient for the molten jet to be guided in as narrow a form as possible. The dissipation of heat from the hot atomized jet to the cooler environment is then particularly low. The viscosity of the melt remains sufficiently low even after it has left the nozzle, so that it is possible to form spherical particles.

Figure 2:
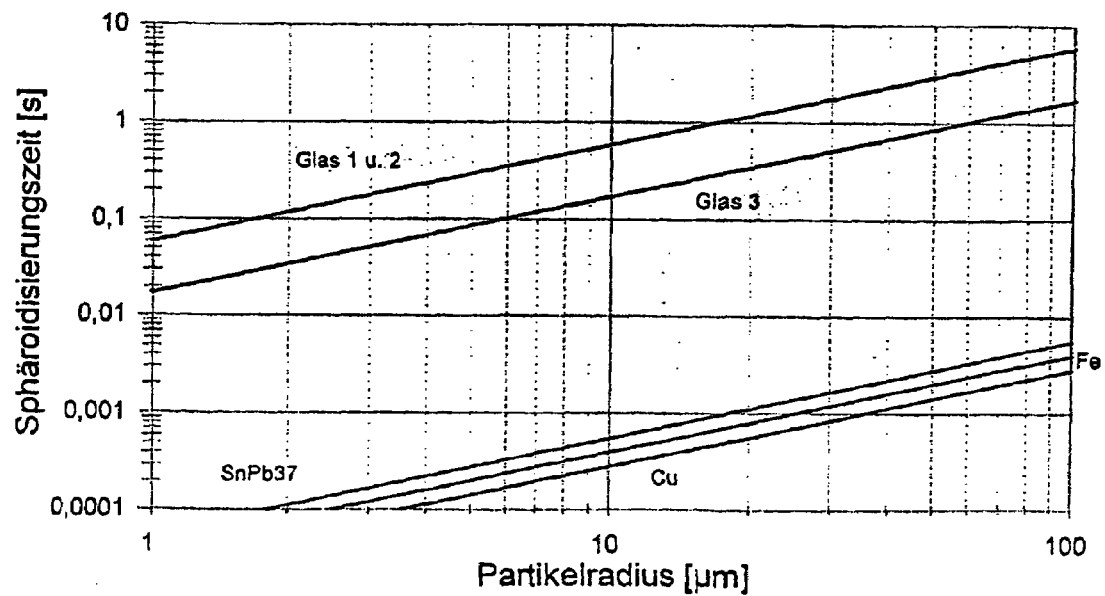
Figure 3:
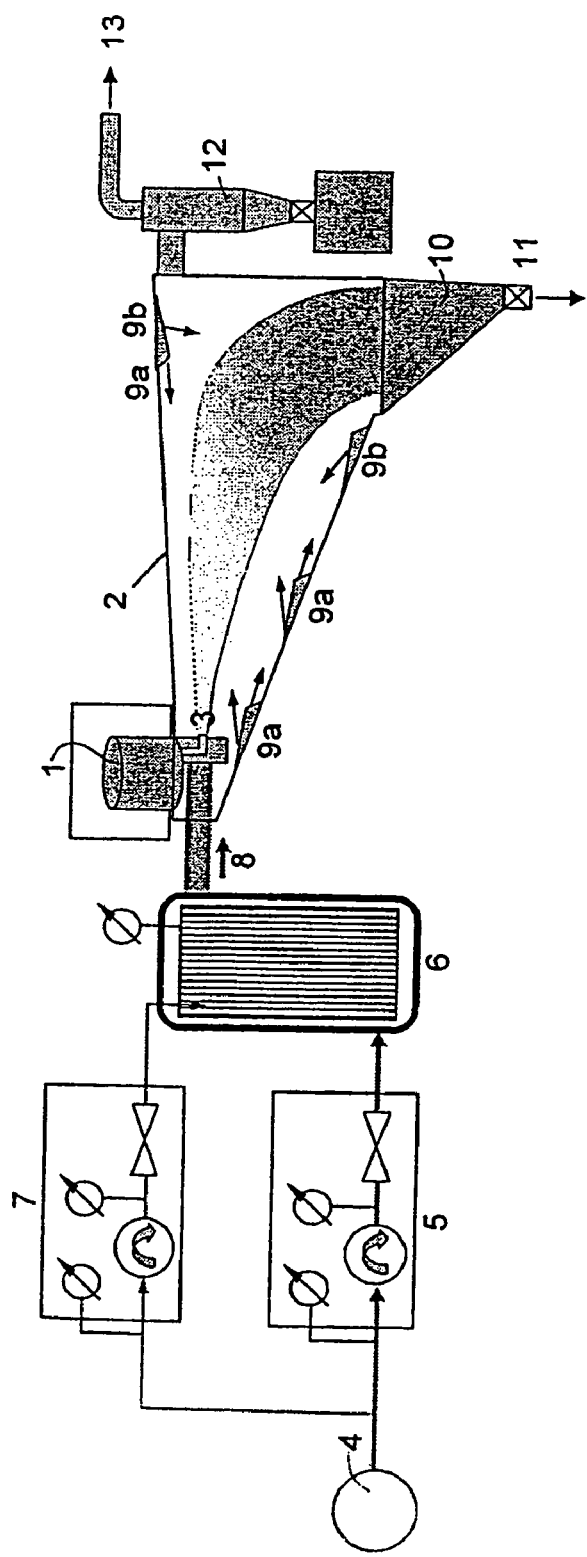

The basic principles and an exemplary embodiment of the invention are explained in more detail below with reference to the drawing, in which:

FIG. 1 shows the viscosity of melts of various materials plotted against temperature, FIG. 2 shows the spheroidization time of various materials plotted against the particle radius, FIG. 3 diagrammatically depicts an apparatus according to the invention.

In FIG. 1, the viscosity of various metals, namely iron, copper and tin, and of various glasses is plotted as a function of temperature. The viscosity of metal melts is below a value of 0.01 Ns/m². By contrast, the melts which are referred to here by the term "highly viscous melts" have a viscosity of more than 0.01 Ns/m². In particular, the glass melts illustrated here are furthermore distinguished by the fact that their viscosity rises considerably, i.e. by several powers of ten, as the temperature drops.

FIG. 2 shows the spheroidization time, i.e. the time required to form an irregularly shaped molten particle into a spherical form, for the various metals and glasses as a function of the particle size. The following relationship applies to the spheroidization time $T_{sph}$:

$$T_{sph} \sim \eta/\sigma$$

where $\eta$ is the dynamic viscosity and $\sigma$ is the surface tension.

As can be seen from FIG. 2, given a similar particle radius the spheroidization time of materials which solidify in a glass-like manner is more than two powers of ten higher than the spheroidization time of metals. Spheroidization times of more than 0.01 sec for a particle radius of 1.0 µm are typical of high-viscosity melts according to the present invention.

FIG. 3 shows an exemplary embodiment of an atomization installation according to the invention for the atomization of high-viscosity melts. A melting apparatus is denoted by 1, an atomization chamber by 2. An annular nozzle 3 is connected to the melting apparatus 1 via a feed passage. A first gas is located in a pressure-storage tank 4. The first gas can be fed to a gas-heating device 6 via a first gas-expansion device 5. In the gas-heating device 6, the gas is heated to a predetermined temperature. If a Pebble heater is used as gas-heating device 6, a second gas expansion device 7 may be connected to the gas-heating device 6 in order to accurately set the temperature of the first gas. The gas-heating device 6 is connected to the annular nozzle 3 via a thermally insulated tube 8. The annular nozzle is, for example, a Laval nozzle, in which the first gas emerges through an annular gap which concentrically surrounds a nozzle which releases the molten jet. The annular gap is expediently arranged as close as possible to the outlet opening or nozzle which releases the melt.

Reference symbols 9a denote first nozzles, and reference symbols 9b denote second nozzles. The first nozzles 9a are used to apply preheated first gas to the particle stream. In this way, the particles are kept on a substantially horizontal trajectory. The cooling and therefore solidification are delayed, so that spherical particles can form.

The second nozzles 9b are used to supply coolant. The coolant may be a gas, liquefied gas or water. The second nozzles are oriented in such a way that the particle stream is diverted from a substantially horizontal trajectory into a vertical trajectory. A conical collecting vessel is denoted by 10 and a bottom tap is denoted by 11. A cyclone separator 12 with downstream cooling device 13 is provided for the purpose of separating out the ultrafine faction. The apparatus functions in the following way:

The first gas is supplied to the gas-heating device 6 via the gas expansion devices 5 and/or 7. In the gas-heating device 6, the first gas is heated to a temperature in the region of the setting temperature or above the glass-forming temperature $T_s$ or 1.5 $T_g$ of the material which is to be atomized. Via the thermally insulated tube 8, the heated first gas passes, under a pressure of up to 50 bar, into the annular nozzle 3, where it emerges onto the molten jet, at an angle of approximately 10–20°. The molten jet is atomized by the action of the first gas. The preheated first gas carries the atomized particles onward, initially in the horizontal direction. To maintain the substantially horizontal trajectory, first gas is additionally blown into the atomization chamber 2 through the first nozzles 9a. As a result, spherical particles are formed.

The particles are then cooled in a cooling zone. The cooling zone is located in a region in which the particle stream deviates from a horizontal trajectory into a vertical trajectory. The diversion of the trajectory of the particle stream is assisted by streams of coolant which emerge through the second nozzles 9b.

Finally, the spherical particles which have been produced are collected in the collection vessel 10 and are removed by the bottom tap 11. The ultrafine fraction is separated out by means of the cyclone separator 12. Furthermore, the hot gas is discharged in this way. The hot has is cooled by means of cooling devices connected downstream of the cyclone separator 12 or is recycled in order to heat a second Pebble heater.

LIST OF REFERENCE SYMBOLS

1 Melting apparatus
2 Atomization chamber
3 Nozzle
4 Compressed-gas vessel
5 First gas expansion station
6 Gas-heating device
7 Second gas expansion station
8 Thermally insulated tube
9a First nozzles
9b Second nozzles
10 Connection vessel
11 Bottom tap
12 Cyclone separator
13 Cooling device

The invention claimed is:

1. A process for producing powders, which are formed from substantially spherical particles, from a material, such as glass, ceramic or plastic, which forms a highly viscous melt, which solidifies either at a glass forming temperature $T_g$ or at a setting temperature $T_s$, said method comprising the steps of:
    a) producing a melt with a dynamic viscosity η in the range between 0.01 and 100 Ns/m$^2$,
    b) atomizing the melt using a first gas, the first gas, at an outlet of an annular gap of an annular nozzle, being at least at a temperature $T_A \geq T_g$ or $\geq 0.5\ T_s$ and an angle of incidence of the first gas with respect to a molten-jet axis being up to 25°,
    c) cooling particles formed during the atomizing step in a cooling zone, which is connected downstream of the annular nozzle, using a coolant, the coolant being at a temperature $<T_g$ or $T_s$.

2. The process as claimed in claim 1, wherein the temperature of the first gas is $\geq 1.5\ T_g$ or $\geq 1.0\ T_s$.

3. The process as claimed in claim 1, wherein the temperature of the first gas, at the outlet of the annular nozzle, is in the range of ±100 K of the setting temperature $T_s$ of the material.

4. The process as claimed in claim 1, wherein the first gas is air, nitrogen, noble gas, oxygen or a mixture thereof.

5. The process as claimed in claim 1, wherein the first gas is preheated by means of a pebble heater.

6. The process as claimed in claim 1, wherein a throughput of the first gas is set to a value of between 0.1 and 10 m$^3$/min.

7. The process as claimed in claim 1, wherein, for atomization, a pressure of the first gas is set to a value of from 1 to 50 bar.

8. The process as claimed in claim 1, wherein the first gas is passed through at least one Laval outlet opening.

9. The process as claimed in claim 1, wherein the coolant is cryogenic liquefied, second gas or water.

10. The process as claimed claim 1, wherein the coolant is blown in toward the annular nozzle, in a direction opposite to a direction of particle flow.

11. The process as claimed in claim 1, wherein a bath formed from cryogenic liquefied gas or water is provided as a further coolant.

12. The process as claimed in claim 1, wherein a particle stream, which forms downstream and in a vicinity of the annular nozzle, is guided substantially horizontally.

13. The process as claimed in claim 12, wherein the particle stream, at a distance from the annular nozzle, is diverted into a substantially vertical direction.

14. The process as claimed in claim 12, wherein the guiding and/or diverting of the particle stream is assisted by blowing in coolant.

15. The process as claimed in claim 1, wherein the first gas, if appropriate a mixed gas formed from the first gas and the coolant, is discharged and used to preheat a second pebble heater.

16. The process as claimed in claim 1, wherein the angle of incidence of the first gas with respect to the molten-jet axis is between 10° and 20°.

17. An apparatus for carrying out the process as claimed in claim 1, comprising:
    aa) a device for preheating a first gas,
    bb) a vessel for holding a melt, wherein
    cc) the annular nozzle comprising a nozzle for releasing the melt as a melt jet, said melt jet forming a molten-jet axis, and an annular gap concentrically surrounding the nozzle and through which the first gas emerges, said annular nozzle facing toward an atomization chamber, said annular nozzle being arranged substantially horizontally such that said molten-jet axis is substantially horizontal and said annular gap through which the first gas emerges is at the angle of incidence of up to 25° with respect to the molten-jet axis,
    dd) a device for cooling a particle stream that forms downstream of the annular nozzle, and
    ee) a device for diverting the particle stream into a substantially vertical direction.

18. The apparatus as claimed in claim 17, wherein the preheating device is a pebble heater.

19. The apparatus as claimed in claim 17, wherein said annular nozzle is adjustable so as to vary a width of said annular gap.

20. The apparatus as claimed in claim 17, wherein said annular nozzle is disposed and oriented such that the angle of incidence of the first gas with respect to the molten-jet axis is between 10° and 20°.

* * * * *